(12) United States Patent
Peterson

(10) Patent No.: US 8,967,648 B2
(45) Date of Patent: Mar. 3, 2015

(54) CONTINUOUS FORCE CONTROL FOR DUAL AIR SPRING CONFIGURATION

(75) Inventor: John Ashley Peterson, Troy, MI (US)

(73) Assignee: ArvinMeritor Technology, LLC, Troy, MI (US)

(*) Notice: Subject to any disclaimer, the term of this patent is extended or adjusted under 35 U.S.C. 154(b) by 1252 days.

(21) Appl. No.: 12/402,662

(22) Filed: Mar. 12, 2009

(65) Prior Publication Data

US 2010/0230913 A1 Sep. 16, 2010

(51) Int. Cl.
*F16F 9/05* (2006.01)
*B60G 17/052* (2006.01)
*B60G 11/27* (2006.01)
*B60G 17/015* (2006.01)
(Continued)

(52) U.S. Cl.
CPC .......... *B60G 17/0155* (2013.01); *B60G 17/016* (2013.01); *B60G 17/0485* (2013.01); *B60G 17/0521* (2013.01); *F16F 9/057* (2013.01); *B60G 2202/152* (2013.01); *B60G 2202/314* (2013.01); *B60G 2202/412* (2013.01); *B60G 2400/0523* (2013.01); *B60G 2400/104* (2013.01); *B60G 2400/208* (2013.01); *B60G 2400/33* (2013.01); *B60G 2400/34* (2013.01); *B60G 2400/39* (2013.01); *B60G 2400/41* (2013.01); *B60G 2400/50* (2013.01); *B60G 2400/51* (2013.01); *B60G 2400/51222* (2013.01); *B60G 2500/202* (2013.01); *B60G 2500/204* (2013.01); *B60G 2500/2041* (2013.01); *B60G 2500/22* (2013.01); *B60G 2600/18* (2013.01); *B60G 2600/20* (2013.01); *B60G 2800/012* (2013.01); *B60G 2800/0122* (2013.01); *B60G 2800/014* (2013.01); *B60G 2800/162* (2013.01); *B60G 2800/164* (2013.01); *B60G 2800/91* (2013.01)
USPC .............. 280/124.157; 280/5.515; 280/5.514; 280/6.157; 267/64.24; 267/64.25; 267/64.27; 267/64.28; 267/122; 267/64.21; 267/64.16

(58) Field of Classification Search
USPC ..................... 280/5.503, 5.514, 6.157, 6.159, 280/124.157, 5.515, 5.5; 267/64.19, 64.21, 267/64.23, 64.24, 64.25, 64.27, 64.28, 267/64.16, 122; 188/298
IPC ............... F16F 9/05,9/43; B60G 17/052, 11/27, B60G 17/056
See application file for complete search history.

(56) References Cited

U.S. PATENT DOCUMENTS

| 2,115,072 A | * | 4/1938 | Hunt et al. ................... 267/256 |
| 4,722,548 A | | 2/1988 | Hamilton |
| 4,852,903 A | | 8/1989 | Tanaka |

(Continued)

FOREIGN PATENT DOCUMENTS

| DE | 4135900 | 5/1993 |
| DE | 10033046 | 1/2002 |

(Continued)

OTHER PUBLICATIONS

EP Search Report dated May 18, 2011.

*Primary Examiner* — Keith Frisby
(74) *Attorney, Agent, or Firm* — Brooks Kushman P.C.

(57) ABSTRACT

An active air suspension system includes an air spring assembly that has a piston airbag and a primary airbag mounted around the piston airbag to provide a variable force and rate dual air spring configuration. The air suspension system is configured to accurately control pressure within the system in a closed-loop manner.

19 Claims, 3 Drawing Sheets

(51) Int. Cl.
  *B60G 17/016* (2006.01)
  *B60G 17/048* (2006.01)

(56) References Cited

U.S. PATENT DOCUMENTS

| | | | |
|---|---|---|---|
| 5,513,108 A | 4/1996 | Kishimoto | |
| 6,144,907 A * | 11/2000 | Shibuya et al. | 701/37 |
| 6,427,986 B1 * | 8/2002 | Sakai et al. | 267/64.15 |
| 7,156,382 B2 * | 1/2007 | Lloyd | 267/64.28 |
| 2005/0093265 A1 | 5/2005 | Niaura et al. | |
| 2005/0098931 A1 | 5/2005 | Schisler | |
| 2005/0173851 A1 | 8/2005 | Lloyd | |
| 2006/0267297 A1 * | 11/2006 | Nordmeyer et al. | 280/5.515 |
| 2007/0073461 A1 | 3/2007 | Fielder | |
| 2010/0230910 A1 * | 9/2010 | Kleckner et al. | 280/5.5 |
| 2010/0230911 A1 * | 9/2010 | Peterson | 280/5.503 |
| 2010/0230912 A1 * | 9/2010 | Lloyd | 280/5.503 |

FOREIGN PATENT DOCUMENTS

| | | |
|---|---|---|
| GB | 2218677 | 11/1989 |
| GB | 2220176 | 1/1990 |
| GB | 2406548 | 4/2005 |
| JP | 62167943 | 7/1987 |
| JP | 3177633 | 8/1991 |
| WO | 2006130492 A1 | 12/2006 |

* cited by examiner

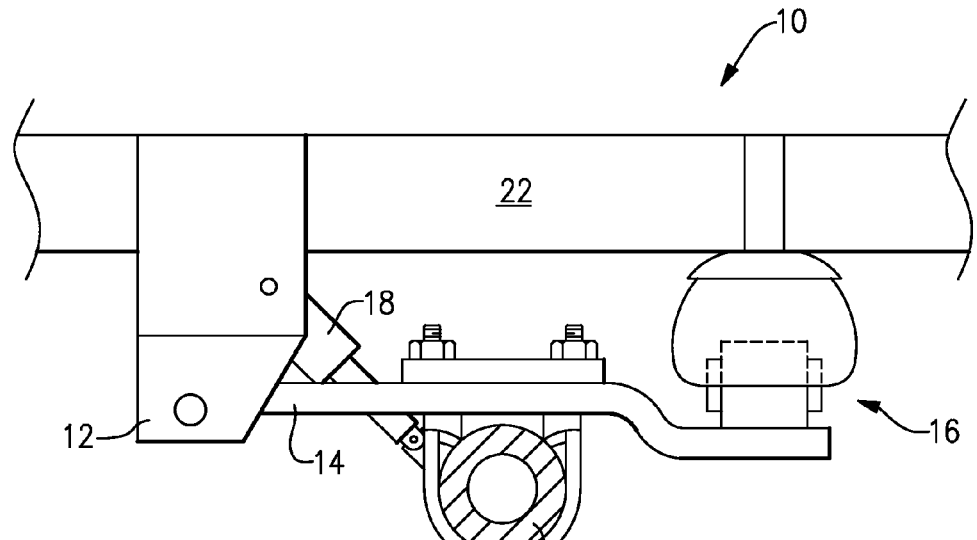
FIG. 1
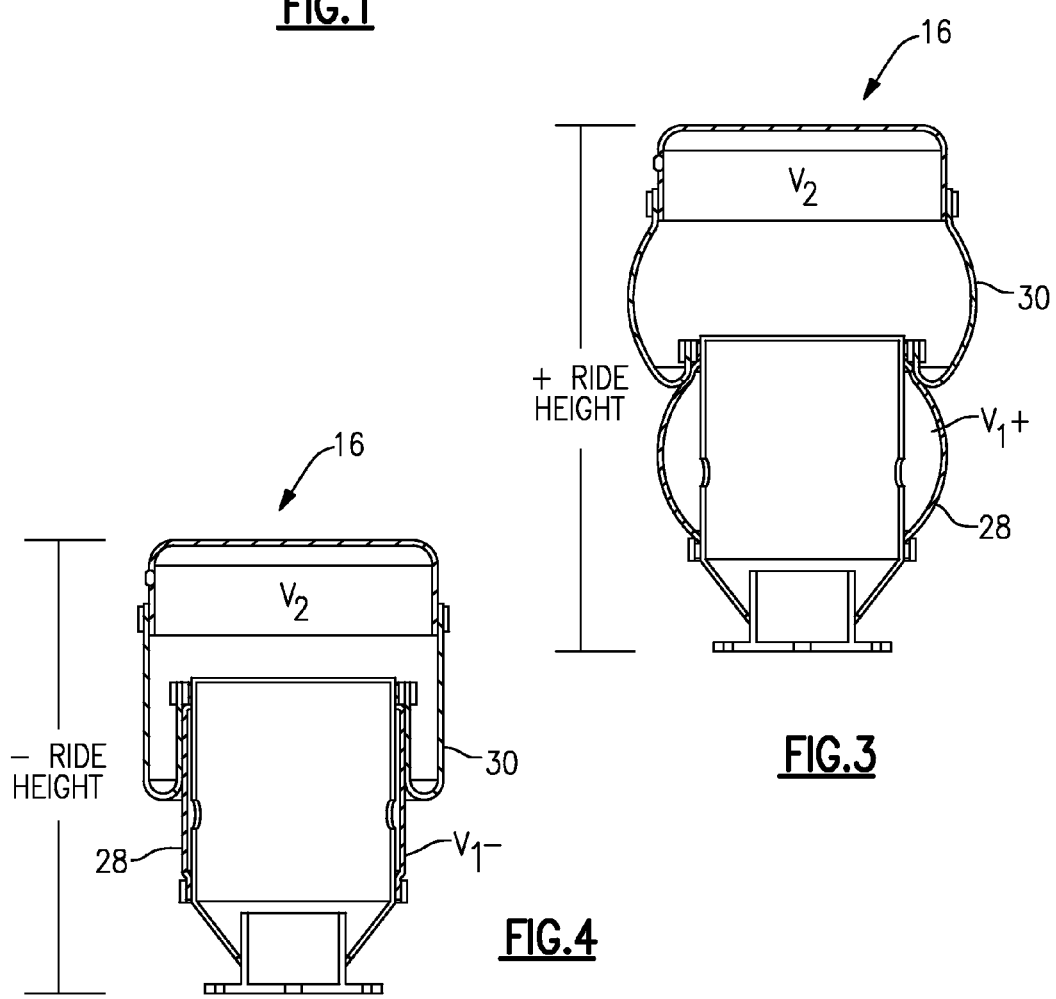
FIG. 3
FIG. 4

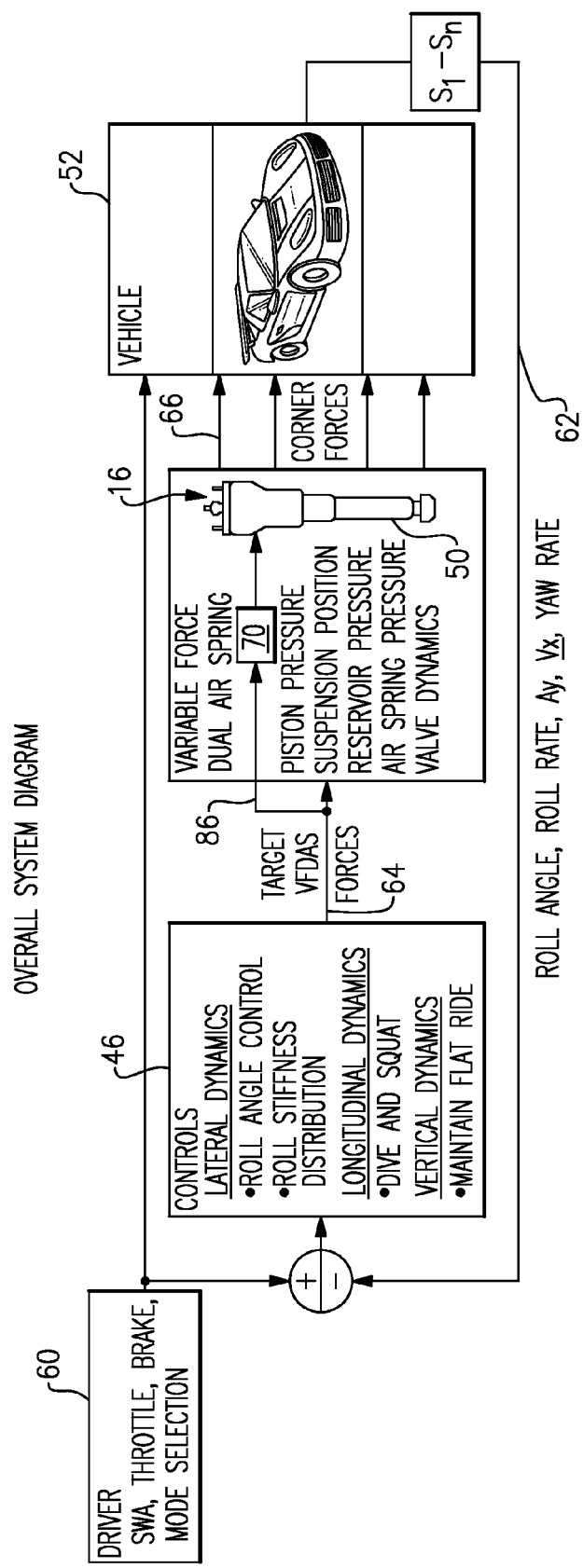

CONTINUOUS FORCE CONTROL FOR DUAL AIR SPRING CONFIGURATION

TECHNICAL FIELD

This invention generally relates to an active air suspension system with a variable force and rate dual air spring that utilizes a plurality of vehicle inputs to generate normalized force requests for vehicle behavior modification purposes.

BACKGROUND OF THE INVENTION

Air suspensions utilize air springs to provide desired output characteristics, such as ride comfort and vehicle performance for example. One known active air suspension uses an air spring assembly that includes a primary airbag mounted around a piston airbag such that the piston airbag provides a rolling surface for the primary airbag. A change in piston airbag volume changes an effective piston area of the primary airbag. A relatively small change in the effective piston area provides a change in a spring rate of the air spring assembly. The pressures in the piston airbag and the primary airbag are selectively controlled to provide infinite variation in spring rates without requiring any auxiliary tanks and associated actuators. The smaller volume of the piston airbag relative to the larger volume of the primary airbag permits rapid pressure and volume changes to enable active suspension control.

Traditionally, active air suspension systems have made gross discrete changes in suspension spring stiffness through switchable air spring volumes. The active air suspension with a dual air spring configuration described above is a force and a spring stiffness adjusting device. One problem with such a system is that it is difficult to actively control and adjust spring forces in an accurate manner.

SUMMARY OF THE INVENTION

An active air suspension system with a variable force and rate dual air spring is configured to analyze a plurality of vehicle inputs and to generate output control signals to vary and control spring forces in an accurate manner.

In one example, the active air suspension system includes an air spring assembly that has a piston airbag and a primary airbag mounted around the piston airbag to provide the variable force and rate dual air spring configuration. The air suspension system is configured to accurately control pressure within the piston and primary airbags to achieve an overall desired performance criteria.

In one example, the system is a force controlling device when the vehicle is in a dynamic maneuver. When the vehicle is in a quasi-static state the system operates as a spring-rate changing device. When the vehicle is in a dynamic situation, such as executing a turning maneuver or a drive-off event, weight transfer of the vehicle requires an opposing force to modify the rate of change of weight transfer to thereby change the vehicle character. The opposing force is provided by the active control of the device.

In one configuration, at least one air spring assembly comprises a plurality of air spring assemblies each having one primary airbag and one associated piston airbag, the valve assembly comprises a separate valve assembly for each air spring assembly, and at least one pressure sensor comprises a plurality of pressure sensors with one pressure sensor being associated with each piston airbag. The controller continuously receives pressure input signals from each of the pressure sensors indicating specific pressure changes within the associated piston airbag. The controller then actively adjusts pressure within each of the piston airbags in response to the pressure changes to maintain the desired spring stiffness in a closed-loop manner.

In one example, the controller generates a plurality of control signals to control air supply into and out of each piston airbag independently of all other piston airbags.

These and other features of the present invention can be best understood from the following specification and drawings, the following of which is a brief description.

BRIEF DESCRIPTION OF THE DRAWINGS

FIG. 1 is a general side view of one example of an active air suspension as installed on a vehicle.

FIG. 3 is a sectional view of the air spring in a first position.

FIG. 4 is a sectional view of the air spring in a second position.

FIG. 5 is a diagram showing an overall system incorporating variable force and rate dual air springs for a vehicle.

DETAILED DESCRIPTION OF THE PREFERRED EMBODIMENT

Figure 2:
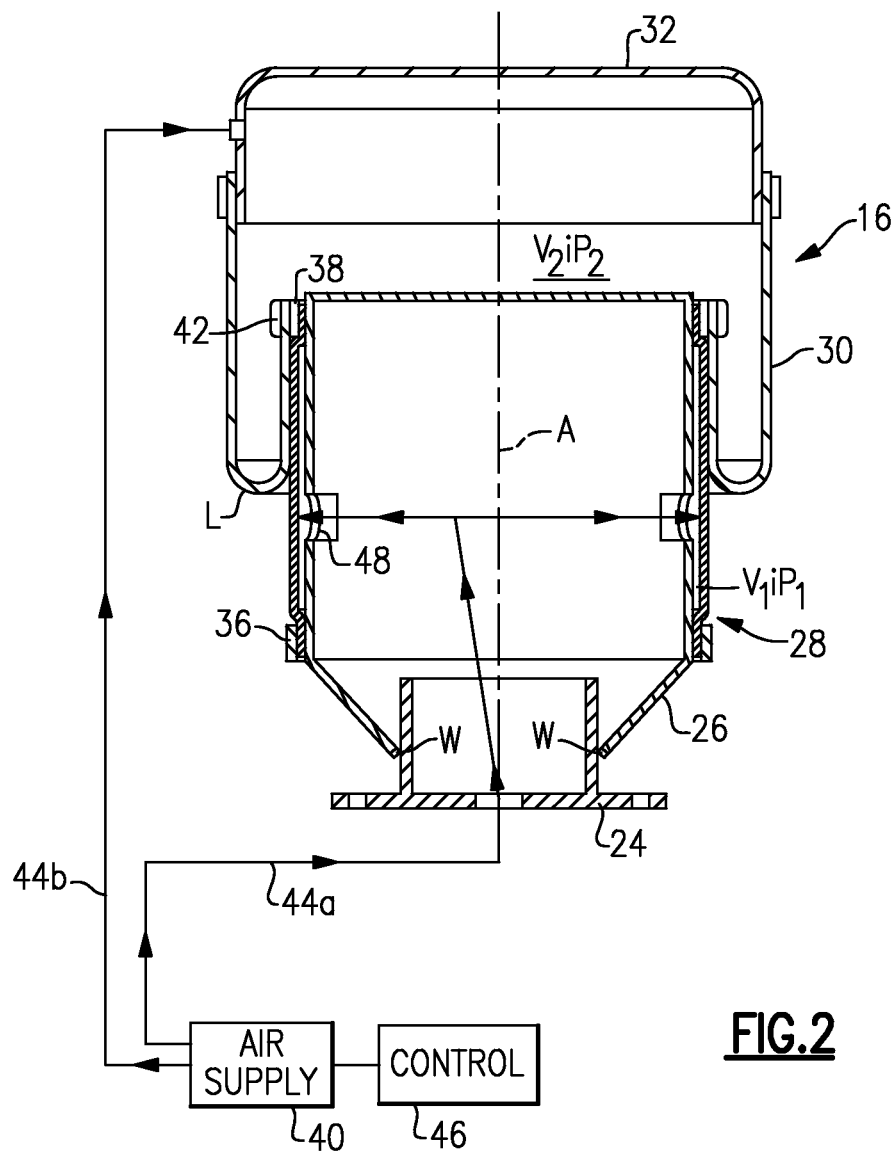
FIG. 2 is a sectional view of an air spring assembly as used in the active air suspension of FIG. 1.

FIG. 1 illustrates an air suspension system 10 for a vehicle. The air suspension system 10 generally includes a bracket 12, a longitudinal member 14, an air spring assembly 16, a damper 18, and an axle assembly 20. The air suspension system 10 is fixed to a frame or chassis of the vehicle (shown schematically at 22). The longitudinal member 14 could comprise a suspension arm, for example, and the axle assembly 20 could comprise any type of axle, such as a drive axle, non-drive axle, trailer axle, etc. The axle assembly 20 extends between laterally spaced wheels (not shown). It should be understood that the air suspension system 10 includes a longitudinal member 14, an air spring assembly 16, and a damper 18 at each lateral end of the axle.

Referring to FIG. 2, the air spring assembly 16 is illustrated in cross-section. The air spring assembly 16 is defined along a central vertical axis A and includes a lower mount 24 (illustrated schematically), a piston structure or support 26 attached to the lower mount 24, a piston airbag 28, and a primary airbag 30. An upper mount 32 is attached to the primary airbag 30. The upper 32 and lower 24 mounts provide attachment for the air spring assembly 16 between the longitudinal member 14 and chassis 22 (see FIG. 1).

The piston support 26 is a cylindrical member defined about the axis A. At the lower mount 24 the piston support 26 can be attached to many different structures such as a strut, damper, or other similar mechanism, for example. In one example, the piston support 26 is attached to the lower mount 24 at welds W; however other attachment methods could also be used. The piston support 26 and the lower mount 24 are relatively rigid components.

The piston airbag 28 is a flexile, resilient member and is attached to the piston support 26 through a first band 36 and a second band 38. The first band 36 is secured at a lower end of the piston support 26 and the second band 38 is secured at an upper or opposite end of the piston support 26. While bands are shown, it should be understood that other attachment structures and/or methods could be used to secure the piston airbag 28 to the piston support 26. The piston airbag 28 defines a first volume V1 that is enclosed vertically between the bands 36, 38 and between an inner surface of the piston airbag 28 and an outer surface of the piston support 26.

The primary airbag 30 is mounted to the piston air bag 28 through a third band 42 which is spaced radially outwardly relative to the second band 38 with the primary airbag 30 being located between the second 28 and third 42 bands. In other words, the primary airbag 30 is sandwiched between the third band 42 and the second band 38. The primary airbag 30 defines a second volume V2. It should be understood that while two volumes V1, and V2 are disclosed in the illustrated embodiment, additional volumes could also be utilized within the spring assembly 16 as needed. Further, any of these volumes may be selectively segmented to provide further incremental volume changes.

An air supply system 40 (illustrated schematically in FIG. 2) communicates air independently into the volumes V1, V2 through first and second supply conduits 44a, 44b respectively in response to a controller 46 (illustrated schematically). The controller 46 is a suspension controller that provides active suspension control methodology. Ports 48 through the piston support 26 supply air into the first volume V1.

The piston airbag 28 operates as a rolloff piston surface for the primary airbag 30. In other words, the primary airbag 30 provides a rolling lobe L over a piston assembly having a variable diameter provided by the variable volume of the piston airbag 28. As the air spring assembly 16 experiences road load inputs, the lobe L of the primary airbag 30 rolls along the outer surface of the piston airbag 28. By changing the volume V1 or pressure P1 within the piston airbag 28 the outer diameter of the piston airbag 28 changes. A change in the piston airbag 28 volume V1 thereby changes the effective piston area of the primary airbag 30. It is also understood that the primary airbag 30 will exert a pressure P2 against the piston airbag 28, tending to reduce the outer diameter of the piston airbag 28 until an equilibrium diameter is reached. Therefore a change in pressure P1 will change the radial spring rate of the piston airbag 28 and change the equilibrium diameter also affecting the primary airbag spring rate.

Referring to FIG. 3, increasing the air pressure within the volume V1 increases the diameter of the piston airbag 28 to obtain a greater spring rate and ride height. That is, the increase in diameter of the piston airbag 28 results in an extension of the airbag assembly 16 as volume V1 effectively provides a larger rolloff piston. The opposite results are obtained when the pressure within the piston airbag 28 is reduced as volume V1 respectively decreases (FIG. 4). This reduces the ride height and spring rate.

A relatively small change in volume V1 provides a change in the spring rate of the primary airbag 30 as the diameter of the rolloff surface is selectively modified. A change in the pressure within the volume V1 couples a change in spring rate with a change in ride height when the pressure within volume V2 is maintained. The compression and rebound rates may alternatively be decoupled by simultaneously changing the volume of both V1 and V2.

By selectively controlling the pressure within volumes V1 and V2, infinite variation in spring rates are provided without an auxiliary tank and associated actuators. The relatively smaller volume of volume V1 relative to volume V2 permits rapid pressure and volume changes which enables active suspension control.

In the example shown in FIG. 5, each air spring assembly 16 is associated with one damper 50. In one example, the damper 50 comprises an electrically controlled shock absorber. The controller 46 generates control signals to vary a damper characteristic, such as damping ratio for example, as needed to achieve a desired handling/comfort level. An outer structure of the damper 50 is attached to the lower mount 24 of the air spring assembly 16. There is one air spring and damper combination associated with each wheel, i.e. corner, of the vehicle 52 shown in FIG. 5. The controller 46 is configured to use the variable force and rate dual air spring configuration in combination with the damper to provide a real-time control of modulation of spring stiffness to improve vehicle handling and/or ride comfort.

As shown in FIG. 5, there are a plurality of driver inputs 60 to the vehicle 52, which are communicated to the controller 46. Examples of such inputs include hand wheel angle inputs, steered wheel angle inputs, steered wheel inputs, throttle inputs, brake pedal and pressure inputs, transmission mode selection, etc. A plurality of vehicle inputs 62 are also communicated to the controller 46. Examples of these inputs include vehicle roll angle, roll rate, yaw rate, various directional accelerations, wheel speeds etc. The controller 46 can also receive various inputs that are associated with the air spring assemblies 16. Examples of these inputs include damper inputs, suspension position (ride height), air supply reservoir pressure, pressure within the airbags 28, 30, flow valve dynamics, etc. Various sensors S1-Sn are incorporated into the vehicle system such that each of these inputs can either be directly measured or estimated based on related input data.

The controller 46 uses these inputs to control various dynamics of the vehicle 52. For example, the controller 46 uses these inputs to control vehicle lateral dynamics (such as roll angle and yaw rate for example), longitudinal dynamics (dive and squat for example), and vertical dynamics (maintenance of a flat ride for example). The controller 46 accomplishes this by generating control signals 64 that are communicated to the variable force and rate dual air spring assemblies 16 that are located at each vehicle wheel. The controller 46 determines a desired spring force for each of these air spring assemblies 16 and then controls air flow into and out of the air spring assemblies 16 to achieve the desired spring force. When the desired spring forces are achieved at each air spring assembly 16, the appropriate vehicle behavior is provided at each wheel.

The controller 46 can also utilize data that is stored in memory such as look-up tables, specific vehicle application data, and past vehicle performance data for example. The controller takes the inputs such as hand wheel angle, steered wheel angle, yaw rate, lateral acceleration, wheel speeds, brake pedal switch activation, and brake pressure to determine and generate the control signal 64 for each air spring assembly 16. The various inputs to the controller 46 are communicated in a continuous manner such that a closed feedback loop configuration is provided. The controller 46 analyzes the various inputs to determine the appropriate spring rate/force to achieve the desired vehicle behavior (handling/ride comfort levels). The controller 46 further analyzes the various inputs to determine whether or not pressure within the primary 30 and/or piston 28 airbags needs to be adjusted to achieve this desired spring rate/force.

If inflation or deflation is required, the controller 46 generates a control signal 86 that is communicated to a valve assembly 70 associated with the air spring assembly 16. The valve assembly 70 can include separate valves for filling/inflating the airbags and deflating/exhausting the airbags or combinations of valves could be used. The valve assemblies 70 are open/closed as needed to achieve the pressure needed to provide the desired spring force/rate.

Once this pressure is achieved, the controller 46 continuously compiles and analyzes various data inputs to continuously adjust pressure within the air spring assemblies 16 in a closed loop manner. The controller 46 makes a determination if further adjustment/compensation is needed and generates control signals that are communicated to the appropriate valve assemblies 70.

It should be understood that the controller 46 could comprise a single vehicle controller that controls all vehicle systems, or the controller 46 could be comprised of several controllers and control modules that are linked together to transfer and communicate various data inputs and outputs as needed. Further, one of ordinary skill in the art would be able to determine a software algorithm to accomplish the steps set forth above.

Closed loop control of the active air suspension provides an easily maintainable and accurate control for vehicle pitch, yaw, and roll. Thus, the closed loop configuration provides a real-time control that significantly increases system accuracy. This in turn provides improved handling and ride control for the vehicle.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An active air suspension system comprising:
    at least one air spring assembly including a piston airbag and a primary air bag mounted around said piston airbag wherein said piston and primary airbags cooperate to provide a spring force and spring stiffness adjusting device;
    a plurality of sensors that measure a plurality of vehicle characteristics, said sensors generating a plurality of sensor signals;
    a valve assembly that controls air supply into and out of said air spring assembly; and
    a controller receives said sensor signals as inputs, continuously analyzes said inputs to determine an appropriate spring output characteristic including at least a desired spring force and a desired spring stiffness that corresponds to a desired vehicle behavior, and generates an output signal to continuously modify pressure within said air spring assembly to achieve said spring output characteristic.

2. The air suspension system according to claim 1 wherein said controller continuously receives sensor signals as inputs, analyzes the inputs to identify system changes, and continuously and actively adjusts pressure within said air spring assembly in response to identified system changes to maintain said desired spring rate/force in a closed-loop manner.

3. The air suspension system according to claim 2 wherein said controller generates electric control signals to actively control said valve assembly to control air flow into and out of said piston airbag and said primary air bag.

4. The air suspension system according to claim 2 wherein said inputs comprise at least one of hand-wheel angle, yaw rate, lateral acceleration, vehicle wheel speeds, brake pedal activation, or brake pressure.

5. The air suspension system according to claim 2 wherein said inputs comprise hand-wheel angle, yaw rate, lateral acceleration, vehicle wheel speeds, brake pedal activation, and brake pressure.

6. The air suspension system according to claim 2 wherein said controller continuously adjusts spring force and spring rate of each of said air spring assemblies by individually controlling air flow into and out of each piston airbag and each primary airbag.

7. The air suspension system according to claim 1 including a damper mounted to each air spring assembly wherein said controller generates a damper control signal to continuously adjust a damping characteristic in conjunction with adjusting said pressure within said primary and piston airbags to provide said desired vehicle behavior.

8. The air suspension system according to claim 7 wherein said air spring assembly includes a piston mounted to a lower mount, said primary and piston airbags each being attached to said piston, and wherein one of an inner or outer damper structure is directly mounted to said lower mount of said air spring assembly.

9. The air suspension system according to claim 1 wherein said plurality of vehicle characteristics comprises a plurality of driver inputs, a plurality of vehicle inputs, and a plurality of air spring inputs, and wherein said controller continuously adjusts pressure within said primary and piston airbags as needed to provide said desired vehicle behavior in a closed-loop manner.

10. The air suspension system according to claim 1 wherein said at least one air spring assembly comprises a plurality of air spring assemblies each having one primary airbag and one associated piston airbag, said valve assembly comprises a separate valve assembly for each air spring assembly, and wherein said controller actively adjusts pressure within each of said piston and primary airbags in response to the identified system changes to maintain said desired spring force and stiffness in a closed-loop manner.

11. The air suspension system according to claim 10 wherein said controller generates a plurality of control signals to control air supply into and out of each piston air bag and each primary airbag independently of all other piston and primary airbags.

12. The air suspension system according to claim 10 including at least one damper mounted to each air spring assembly, said controller generating a damper control signal to adjust a damping characteristic.

13. The air suspension system according to claim 12 wherein said at least one damper comprises an electrically controlled shock absorber, and said damping characteristic comprises a damping ratio.

14. A method of controlling airflow within an air suspension system comprising the steps of:
    (a) providing at least one air spring assembly including a piston airbag and a primary air bag mounted around the piston airbag wherein the piston and primary airbags cooperate to provide a spring force and spring stiffness adjusting device, and providing a valve assembly that controls air supply into and out of the piston airbag;
    (b) measuring a plurality of vehicle characteristics with a plurality of sensors and generating a plurality of sensor signals from the plurality of sensors;
    (c) receiving the sensor signals as inputs, continuously analyzing the inputs to determine an appropriate spring output characteristic including at least a desired spring force and a desired spring stiffness that corresponds to a desired vehicle behavior, and generating an output signal to continuously modify pressure within the air spring assembly to achieve the spring output characteristic.

15. The method according to claim 14 including continuously receiving sensor input signals from sensors, identifying system changes, and actively and continuously adjusting pressure within at least one of the piston and primary airbags in response to identified system changes to maintain the desired spring rate force in a closed-loop manner.

16. The method according to claim 15 wherein the inputs comprise hand-wheel angle, yaw rate, lateral acceleration, vehicle wheel speeds, brake pedal activation, and brake pressure.

17. The method according to claim 14 including mounting a damper to each air spring assembly and generating a damper control signal to continuously adjust a damping characteristic in conjunction with adjusting the pressure within the primary and piston airbags to provide the desired vehicle behavior.

18. The method according to claim 17 wherein the air spring assembly includes a piston mounted to a lower mount, the primary and piston airbags each being attached to the piston, and including directly mounting one of an inner or outer damper structure to the lower mount of the air spring assembly.

19. The method according to claim 14 wherein step (b) includes measuring a plurality of driver inputs, measuring a plurality of vehicle inputs, and a plurality of air spring inputs, and wherein step (c) includes continuously adjusting pressure within the primary and piston airbags as needed to provide the desired vehicle behavior in a closed-loop manner.

\* \* \* \* \*